(12) United States Patent
Rule et al.

(10) Patent No.: US 11,683,325 B2
(45) Date of Patent: Jun. 20, 2023

(54) SYSTEMS AND METHODS FOR VERIFIED MESSAGING VIA SHORT-RANGE TRANSCEIVER

(71) Applicant: Capital One Services, LLC, McLean, VA (US)

(72) Inventors: Jeffrey Rule, Chevy Chase, MD (US); Kevin Osborn, Newton Highlands, MA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 262 days.

(21) Appl. No.: 16/990,235

(22) Filed: Aug. 11, 2020

(65) Prior Publication Data

US 2022/0053004 A1  Feb. 17, 2022

(51) Int. Cl.
| | |
|---|---|
| *H04L 9/32* | (2006.01) |
| *H04L 9/30* | (2006.01) |
| *H04L 9/40* | (2022.01) |
| *H04W 4/80* | (2018.01) |
| *H04L 51/046* | (2022.01) |

(Continued)

(52) U.S. Cl.
CPC .......... *H04L 63/126* (2013.01); *H04L 51/046* (2013.01); *H04L 63/0853* (2013.01); *H04W 4/14* (2013.01); *H04W 4/80* (2018.02)

(58) Field of Classification Search
CPC . H04L 63/126; H04L 51/046; H04L 63/0853; H04W 4/80; H04W 4/14
USPC ........................................................ 713/170
See application file for complete search history.

(56) References Cited

U.S. PATENT DOCUMENTS

| | | | |
|---|---|---|---|
| 6,058,373 | A | 5/2000 | Blinn et al. |
| 6,199,762 | B1 | 3/2001 | Hohle |
| 6,342,844 | B1 | 1/2002 | Rozin |

(Continued)

FOREIGN PATENT DOCUMENTS

| | | |
|---|---|---|
| AT | 364303 T | 6/2007 |
| AU | 2002353344 A1 | 5/2003 |

(Continued)

OTHER PUBLICATIONS

Notification of Transmittal of the International Search Report and the Written Opinion of the International Searching Authority issued in PCT/US2019/041217, dated Aug. 1, 2019.

(Continued)

*Primary Examiner* — Haresh N Patel
(74) *Attorney, Agent, or Firm* — Hunton Andrews Kurth LLP

(57) ABSTRACT

Systems and methods for verified messaging through the interaction involving a short-range transceiver, such as a contactless card, a client device and a server are presented. Verified messaging may be provided in the context of using a client device to receive a user identifier from the user's short-range transceiver, such as a contactless card, and sending a messaging request with the user identifier to a server, which may look up client device information and compare with data about the client device accompanying the request. Matching received client device information to stored client device data based on a user identifier obtained from a short-range transceiver provides an enhanced ability to verify that the client device corresponds to the user associated with the short-range transceiver.

20 Claims, 7 Drawing Sheets

System 100

(51) Int. Cl.
*H04W 4/14* (2009.01)
*H04L 9/00* (2022.01)

(56) References Cited

U.S. PATENT DOCUMENTS

| | | |
|---|---|---|
| 6,829,711 B1 | 12/2004 | Kwok et al. |
| 6,834,271 B1 | 12/2004 | Hodgson et al. |
| 6,877,656 B1 | 4/2005 | Jaros et al. |
| 7,128,274 B2 | 10/2006 | Kelley et al. |
| 7,165,727 B2 | 1/2007 | de Jong |
| 7,232,073 B1 | 6/2007 | de Jong |
| 7,246,752 B2 | 7/2007 | Brown |
| 7,319,986 B2 | 1/2008 | Praisner et al. |
| 7,374,099 B2 | 5/2008 | de Jong |
| 7,584,153 B2 | 9/2009 | Brown et al. |
| 7,606,204 B2* | 10/2009 | Sebastian ............ H04B 7/2612 370/431 |
| 7,634,280 B2 | 12/2009 | Modeo |
| 7,793,851 B2 | 9/2010 | Mullen |
| 7,922,082 B2 | 4/2011 | Muscato |
| 8,196,131 B1 | 6/2012 | von Behren et al. |
| 8,302,872 B2 | 11/2012 | Mullen |
| 8,332,272 B2 | 12/2012 | Fisher |
| 8,365,988 B1 | 2/2013 | Medina, III et al. |
| 8,567,670 B2 | 10/2013 | Stanfield et al. |
| 8,615,468 B2 | 12/2013 | Varadarajan |
| 8,750,514 B2 | 6/2014 | Gallo et al. |
| 9,106,665 B2 | 8/2015 | Ahmed et al. |
| 9,178,858 B1 | 11/2015 | Mussman et al. |
| 9,203,823 B2 | 12/2015 | Siegel et al. |
| 9,787,648 B2 | 10/2017 | Broumas et al. |
| 2001/0029485 A1 | 10/2001 | Brody et al. |
| 2001/0034702 A1 | 10/2001 | Mockett et al. |
| 2002/0120583 A1 | 8/2002 | Keresman et al. |
| 2002/0152116 A1 | 10/2002 | Yan et al. |
| 2002/0153424 A1 | 10/2002 | Li |
| 2006/0136334 A1 | 6/2006 | Atkinson et al. |
| 2006/0173985 A1 | 8/2006 | Moore |
| 2007/0061266 A1 | 3/2007 | Moore et al. |
| 2007/0061487 A1 | 3/2007 | Moore et al. |
| 2008/0035738 A1 | 2/2008 | Mullen |
| 2008/0039049 A1 | 2/2008 | Park |
| 2008/0071681 A1 | 3/2008 | Khalid |
| 2008/0308641 A1 | 12/2008 | Finn |
| 2010/0023455 A1 | 1/2010 | Dispensa et al. |
| 2010/0070761 A1 | 3/2010 | Gustave et al. |
| 2011/0101093 A1 | 5/2011 | Ehrensvard |
| 2011/0110511 A1* | 5/2011 | Vendrow ............ H04M 3/42161 379/201.04 |
| 2011/0130168 A1* | 6/2011 | Vendrow ............ H04L 51/216 455/556.1 |
| 2011/0153437 A1 | 6/2011 | Archer et al. |
| 2011/0177797 A1* | 7/2011 | Vendrow ............ H04W 12/08 455/414.1 |
| 2012/0022930 A1* | 1/2012 | Brouhard ............ G06Q 30/0229 705/14.3 |
| 2012/0022944 A1* | 1/2012 | Volpi ................ G06Q 30/0207 705/14.1 |
| 2012/0178366 A1 | 7/2012 | Levy et al. |
| 2012/0207305 A1 | 8/2012 | Gallo et al. |
| 2012/0221962 A1* | 8/2012 | Lew ................ G06F 3/04842 715/752 |
| 2012/0226759 A1* | 9/2012 | Lew ................ H04W 4/14 709/206 |
| 2012/0239742 A1* | 9/2012 | Moradi ............ H04W 4/21 709/204 |
| 2012/0309436 A1* | 12/2012 | Lan ............... H04W 4/14 455/466 |
| 2013/0104251 A1 | 4/2013 | Moore et al. |
| 2013/0171929 A1 | 7/2013 | Adams et al. |
| 2013/0290096 A1* | 10/2013 | Lizotte, III ........ G06Q 30/0246 705/14.45 |
| 2013/0317993 A1* | 11/2013 | Wasserman ........ G06Q 30/016 705/304 |
| 2014/0214674 A1 | 7/2014 | Narula |
| 2015/0244698 A1* | 8/2015 | Zheng ............. H04L 63/08 726/7 |
| 2015/0281183 A1 | 10/2015 | Postrel |
| 2016/0012465 A1* | 1/2016 | Sharp ............. G06Q 20/321 705/14.17 |
| 2016/0048913 A1 | 2/2016 | Rausaria et al. |
| 2016/0183178 A1* | 6/2016 | Marimuthu ........ H04W 8/183 455/432.1 |
| 2016/0335531 A1 | 11/2016 | Mullen et al. |
| 2017/0004502 A1 | 1/2017 | Quentin et al. |
| 2017/0011395 A1 | 1/2017 | Pillai et al. |
| 2017/0024716 A1 | 1/2017 | Jiam et al. |
| 2017/0039566 A1 | 2/2017 | Schipperheijn |
| 2017/0068950 A1 | 3/2017 | Kwon |
| 2017/0103388 A1 | 4/2017 | Pillai et al. |
| 2017/0116447 A1 | 4/2017 | Cimino et al. |
| 2017/0140379 A1 | 5/2017 | Deck |
| 2017/0330173 A1 | 11/2017 | Woo et al. |
| 2018/0039986 A1 | 2/2018 | Essebag et al. |
| 2018/0068316 A1 | 3/2018 | Essebag et al. |
| 2018/0077133 A1 | 3/2018 | Matute |
| 2018/0158080 A1* | 6/2018 | Mehl .............. G06Q 30/0203 |
| 2018/0160255 A1 | 6/2018 | Park |
| 2019/0014107 A1 | 1/2019 | George |
| 2019/0019375 A1 | 1/2019 | Foley |
| 2019/0205244 A1 | 7/2019 | Smith |
| 2019/0363746 A1 | 11/2019 | Zalewski et al. |
| 2019/0378143 A1* | 12/2019 | Volpi ............. G06Q 30/02 |

FOREIGN PATENT DOCUMENTS

| | | |
|---|---|---|
| AU | 2009228017 A1 | 10/2009 |
| CA | 2665832 A1 | 11/2010 |
| CN | 101164078 A | 4/2008 |
| EP | 1249141 A1 | 10/2002 |
| EP | 1833219 A1 | 9/2007 |
| EP | 2092674 A2 | 8/2009 |
| FR | 2834163 B1 | 11/2004 |
| FR | 3 007 600 A1 | 12/2014 |
| GB | 2398707 A | 8/2004 |
| GB | 2457221 A | 8/2009 |
| JP | 2014016980 A | 1/2014 |
| KR | 20070108315 A | 11/2007 |
| WO | 00/49586 A1 | 8/2000 |
| WO | 2008082877 A1 | 7/2008 |
| WO | 2009080999 A2 | 7/2009 |
| WO | 2013100731 A1 | 7/2013 |
| WO | 2014209176 A1 | 12/2014 |

OTHER PUBLICATIONS

International Search Report and the Written Opinion of the International Searching Authority issued in related PCT Application No. PCT/US2021/044637, dated Nov. 9, 2021.

Notification Concerning Transmittal of International Preliminary Report on Patentability from related PCT Application No. PCT/US2021/044637, dated Feb. 23, 2023.

* cited by examiner

SYSTEMS AND METHODS FOR VERIFIED MESSAGING VIA SHORT-RANGE TRANSCEIVER

FIELD OF THE DISCLOSURE

The present disclosure relates generally to verified messaging and, more specifically, to exemplary systems and methods for establishing a verified message session through the interaction of the short-range transceiver, a client device and a server.

BACKGROUND

The development of mobile communications has led to the convenience of consumers and businesses alike. Electronic messaging and other communications may be conducted between and among parties from virtually any location and at any time. Electronic commerce has developed in large part based upon the ability to communicate remotely over networks, as consumers may engage in purchase transactions, or conduct other business, merely by providing credentials electronically such as name and credit or debit card information.

But the use of electronic messaging and other electronic communication techniques presents risks to privacy and security. When parties are remotely located, it is more difficult to verify a user's identity or to verify that the device used for communication corresponds to a device registered with the user. For example, messaging using the short message service (SMS) protocol is not secure; communications conducted via SMS channels may be subject to spoofing in which a malevolent party may manipulate address information in order to impersonate another user or business entity. In such a case, if a user sends confidential information or credentials over the SMS channel, the information or credentials could be compromised or stolen.

These and other deficiencies exist. Thus, it may be beneficial to provide exemplary systems and methods which allow for establishing a verified message session, to overcome at least some of the deficiencies described herein.

SUMMARY

Aspects of the disclosed technology include systems and methods for establishing a verified message session through the interaction involving a user's short-range transceiver, such as a contactless card, a client device and a server. Verified messaging may be provided in the context of using a client device to receive a user identifier and server address from the user's short-range transceiver, such as a contactless card, and sending a messaging request with the user identifier to a server, which may look up client device information and compare with data about the client device accompanying the request. Matching received client device information to stored client device data based on a user identifier obtained from a short-range transceiver, such as a contactless card, provides an enhanced ability to verify that the client device corresponds to the user associated with the short-range transceiver. Security for the user is further enhanced by having a short-range transceiver, such as a contactless card, provided by a trusted service provider which supplies the server address for the verified messaging service.

Embodiments of the present disclosure provide a system for verified messaging, comprising: a database storing user information for a plurality of users, the user information including, for each user, a user identifier and a client device address; a server configured to communicate over a network with a client device, the client device associated with a user; a contactless card associated with the user, the contactless card configured for data communication via a short-range communication field of the client device, the contactless card comprising a processor and a memory, the memory storing data and an applet, wherein the applet is configured to provide a uniform resource identifier (URI) after entry by the contactless card into the short-range communication field of the client device, and wherein the URI comprises a message destination address and a message payload, the message destination address associated with the server; and a processor in data communication with the server and the database, the processor configured to: receive a message session request from the client device, the request including the message payload; determine, based on the message payload, a user identifier corresponding to the user; identify a client device address associated with the user; determine whether the client device address associated with the user corresponds to a source address accompanying the request; and send a response message to the client device, the response message addressed to the client device address.

Embodiments of the present disclosure provide a method for establishing a verified message session, comprising: receiving from a mobile device, via a network, a request to establish a verified message session, the request generated in response to entry by a contactless card into a short-range communication field of the mobile device, the request accompanied by a message payload read from the contactless card, wherein the mobile device and the contactless card are associated with a user; determining, based on the message payload, a user identifier corresponding to the user; identifying a mobile device number associated with the user; establishing a verified message session in response to the request; and transmitting a first message to the mobile device via the mobile device number.

Embodiments of the present disclosure provide a method for verified SMS messaging, comprising: establishing a database storing user information for a plurality of users, the user information including, for each user, a user identifier and a mobile device number; providing a contactless card configured for data communication via a near field communication (NFC) field of a mobile device, the contactless card comprising a processor and a memory, the memory storing data and an applet, wherein the applet is configured to provide a short message service (SMS) uniform resource identifier (URI) after entry by the contactless card into the NFC field of the mobile device, and wherein the URI comprises a short message service (SMS) destination address and a message payload, the SMS destination address associated with the server; receiving from the mobile device, via a network, a request to establish a verified SMS message session, the request generated in response to entry by the contactless card into the NFC field of the mobile device, the request accompanied by a message payload read from the contactless card; determining, based on the message payload, a user identifier corresponding to the user; obtaining from the database a mobile device number associated with the user; determining whether the mobile device number associated with the user corresponds to a caller identification number accompanying the request; establishing a verified SMS message session in response to the request; and transmitting a short message service (SMS) message to the mobile device via the mobile device number.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Exemplary embodiments of the disclosed systems and methods provide for establishing a verified message session through the interaction involving a user's short-range transceiver, such as a contactless card, a client device and a server. Verified messaging may be provided in the context of using a client device to send a verified messaging request, along with a user identifier obtained from the user's short-range transceiver, to a server, which may look up client device information and compare with data about the client device accompanying the request. Benefits of the disclosed technology may include improved messaging and security, and improved user experience, due to an enhanced ability to verify that the client device corresponds to the user associated with the short-range transceiver via matching received client device information to stored client device data, and due to having a short-range transceiver provided by a trusted service provider which supplies the server address for the verified messaging service.

Figure 1A:
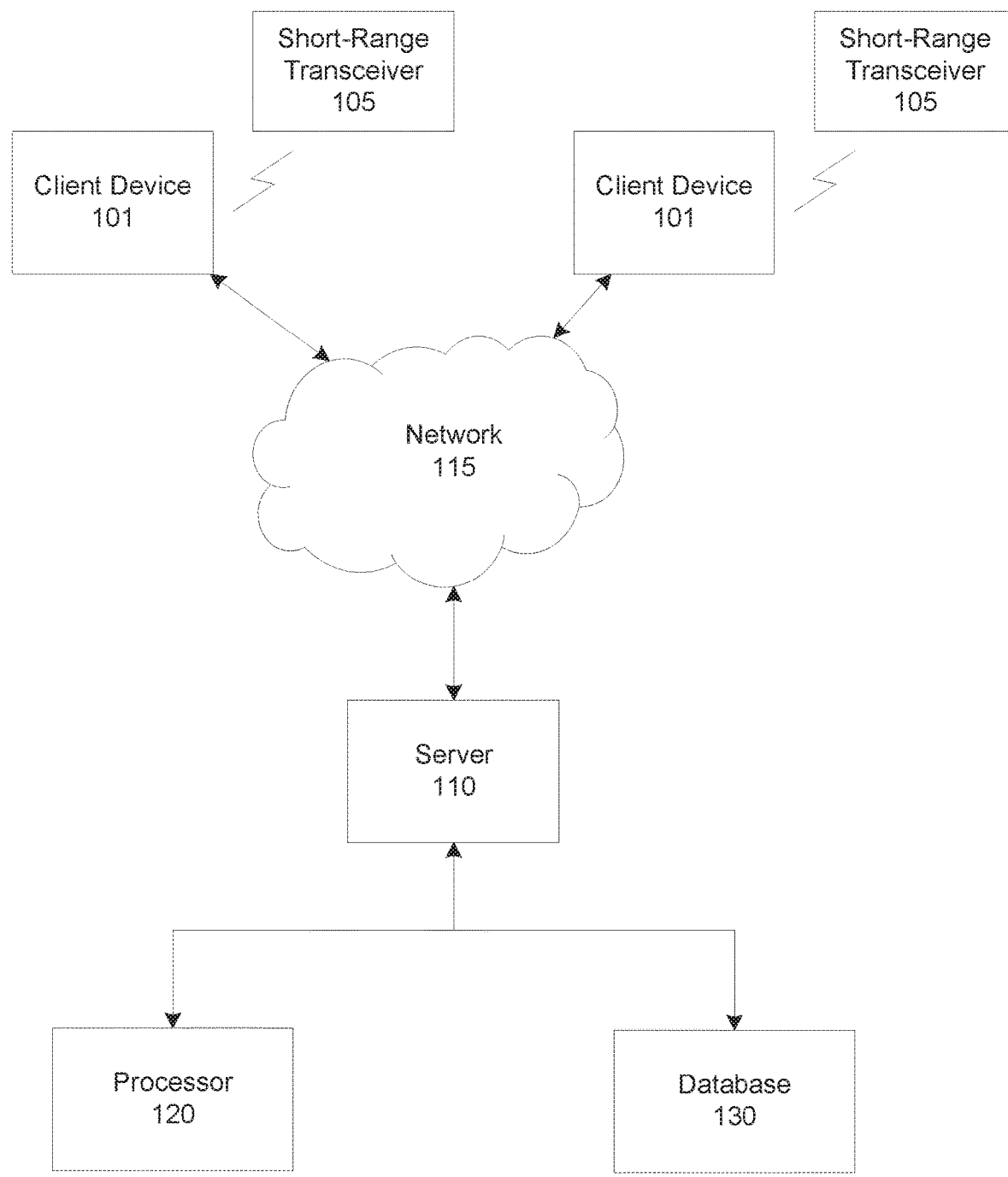
FIG. 1A is a diagram of a verified messaging system according to one or more example embodiments.

FIG. 1A shows a diagram illustrating a verified messaging system 100 according to one or more example embodiments. As discussed further below, system 100 may include one or more client devices 101, one or more short-range transceivers 105, server 110, processor 120 and database 130. Client device 101 may communicate with server 110 via network 115. Although FIG. 1 illustrates certain components connected in certain ways, system 100 may include additional or multiple components connected in various ways.

System 100 may include one or more client devices, such as client device 101, which may each be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Client device 101 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. Client device 101 may be capable of handling short message service (SMS) messages, such as text messages (e.g., via a standard SMS messaging application). Many mobile phone devices include a standard SMS messaging application as part of the mobile phone operating system. Additional features that may be included in a client device, such as client device 101, are further described below with reference to FIG. 2.

System 100 may include one or more short-range transceivers, such as short-range transceiver 105. Short-range transceiver 105 may be in wireless communication with a client device, such as client device 101, within a short-range communications field such as, for example, near field communication (NFC). Short-range transceiver 105 may include, for example, a contactless card, a smart card, or may include a device with a varying form factor such as a fob, pendant or other device configured to communicate within a short-range communications field. In other embodiments, short-range transceiver 105 may be the same or similar as client device 101. Additional features that may be included in a short-range transceiver, such as such as short-range transceiver 105, are further described below with reference to FIG. 3. It is understood that, in embodiments where the short-range transceiver 105 is a contactless card, the present disclosure is not limited to a particular type of contactless card. Rather, the present disclosure includes any type of contactless card, including payment cards (e.g., credit cards, debit cards, gift cards), identity cards (e.g., identification cards, driver's licenses, Social Security cards, membership cards), and travel cards (e.g., passports, tickets, vouchers).

As described further below (e.g., with reference to FIG. 1B), system 100 may utilize Uniform Resource Identifiers. A Uniform Resource Identifier (URI) is a sequence of characters that defines a resource and, in at least some instances, a location or destination address for that resource. Syntax for a Uniform Resource Identifier may depend upon the type of resource, and may be specified in accordance with a given scheme for the resource. For example, a URI for html (i.e., web) pages may given by a respective Uniform Resource Locator address, generally beginning with the characters http://[address] or https://[address]. As another example, a URI for the SMS scheme may begin with the characters sms:+18885551212?body=<body>. In this example, the number 18885551212 may represent a destination number for a device capable of receiving SMS messages, such as, e.g., a mobile phone device or a server; and <body> may include a message or characters that would be passed to the messaging application of the mobile device and used by the messaging application to pre-populate a message to be sent to the destination phone number. Information regarding Uniform Resource Identifiers generally is described in the relevant literature. See, e.g., RFC 3986 (published by Internet Engineering Task Force (IETF)). Information regarding Uniform Resource Identifiers for the SMS scheme is described in the relevant literature. See, e.g., RFC 5724 (also published by the IETF).

System 100 may include one or more servers 110. In some example embodiments, server 110 may include one or more processors (such as, e.g., a microprocessor) which are coupled to memory. Server 110 may be configured as a central system, server or platform to control and call various data at different times to execute a plurality of workflow actions. Server 110 may be a dedicated server computer, such as bladed servers, or may be personal computers, laptop computers, notebook computers, palm top computers, network computers, mobile devices, or any processor-controlled device capable of supporting the system 100.

Server 110 may be configured for data communication (such as, e.g., via a connection) with one or more processors, such as processor 120. In some example embodiments, server 110 may incorporate processor 120. In some example embodiments, server 110 may be physically separate and/or remote from processor 120. Processor 120 may be configured to serve as a back-end processor. Processor 120 may be configured for data communication (such as, e.g., via a connection) with database 130 and/or server 110. Processor 120 may include one or more processing devices such as a microprocessor, RISC processor, ASIC, etc., along with associated processing circuitry. Processor 120 may include, or be connected to, memory storing executable instructions and/or data. Processor 120 may communicate, send or receive messages, requests, notifications, data, etc. to/from other devices, such as client devices 101 and/or 103, via server 110.

Server 110 may be configured for data communication (such as, e.g., via a connection) with one or more databases, such as database 130. Database 130 may be a relational or non-relational database, or a combination of more than one database. In some example embodiments, server 110 may incorporate database 130. In some example embodiments, database 130 may be physically separate and/or remote from server 110, located in another server, on a cloud-based platform, or in any storage device that is in data communication with server 110.

Connections between server 110, processor 120 and database 130 may be made via any communications line, link or network, or combination thereof, wired and/or wireless, suitable for communicating between these components. Such network may include network 115 and/or one or more networks of same or similar type as those described herein with reference to network 115. In some example embodiments, connections between server 110, processor 120 and database 130 may include a corporate LAN.

Server 110 and/or database 130 may include user login credentials used to control access to user accounts. The login credentials may include, without limitation, user names, passwords, access codes, security questions, swipe patterns, image recognition, identification scans (e.g., driver's license scan and passport scan), device registrations, telephone numbers, email addresses, social media account access information, and biometric identification (e.g., voice recognition, fingerprint scans, retina scans, and facial scans).

Database 130 may contain data relating to one or more users and one or more accounts. Data relating to a user may include one or more user identifiers (which may include one or more card identifiers), one or more client device addresses, and one or more user keys, and may be maintained or organized in one or more accounts. A client device address may include, e.g., a mobile phone number, an IP address or any other unique address for the client device. Accounts may be maintained by (or on behalf of) and/or relate to any one or more of a variety of entities, such as, for example (and without limitation) a bank, merchant, online retailer, service provider, merchandizer, manufacturer, social media provider, provider or promoter of sporting or entertainment events, or hotel chain. For example, database 130 may include, without limitation, account identification information (e.g., account number, account owner identification number, account owner name and contact information—any one or more of which may comprise an account identifier), account characteristics (e.g., type of account, funding and trading limitations, and restrictions on access and other activity), and may include information and data pertinent to the account, including financial (such as balance information, payment history, and transaction history), social and/or personal information. Data stored in database 130 may be stored in any suitable format, and may be encrypted and stored in a secure format to prevent unauthorized access. Any suitable algorithm/procedure may be used for data encryption and for authorized decryption.

Server 110 may be configured to communicate with one or more client devices, such as such as client device 101, via one or more networks, such as network 115. Network 115 may include one or more of a wireless network, a wired network or any combination of wireless network and wired network, and may be configured to connect client device 101 to server 110. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more example embodiments, network 115 may comprise a plurality of interconnected networks, such as, for example, the Internet, a service provider's network, a cable television network, corporate networks, such as credit card association networks, a LAN, and/or home networks.

In some embodiments, server 110 may be configured to communicate with one or more client devices, such as such as client device 101, via one or more networks, such as network 115, using a messaging gateway (not shown). A messaging gateway may be a standard messaging gateway such as a short message service (SMS) gateway.

In some example embodiments, server 110 may access records, including records in database 130, to determine a method or methods for communicating with client device 101. The communication method may include an actionable push notification, or other appropriate communication techniques, with an application stored on client device 101. Other communication methods may include a text message or an e-mail, or other messaging techniques appropriate in a network-based client/server configuration. Messages or requests by client device 101 may be communicated to server 110 via an application on the client device, or may be sent by a text message or an e-mail, or other messaging techniques appropriate in a network-based client/server configuration. Communications originating with client device 101 may be sent to server 110 using the same communications method as communications originating with server 110, or via a different communications method.

Figure 1B:
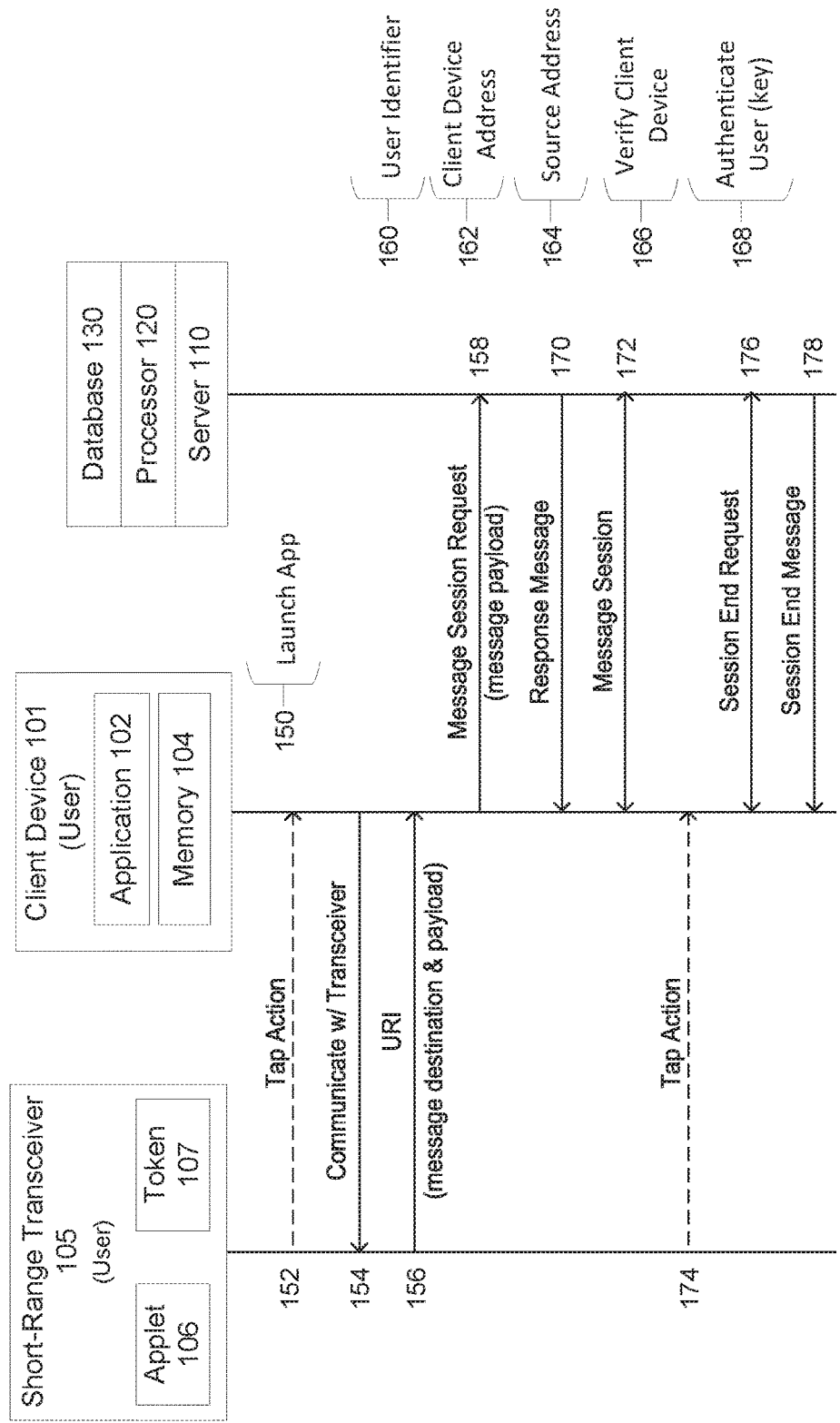
FIG. 1B is a diagram illustrating a sequence for providing a verified messaging session according to one or more example embodiments.

FIG. 1B shows a diagram illustrating a sequence for providing a verified messaging session according to one or more example embodiments. FIG. 1B references similar components of example embodiment system 100 as illustrated in FIG. 1A. Client device 101 may be associated with a user. Client device 101 may include application 102, which may include instructions for execution by client device 101, and memory 104. Client device 101 may include features further described below with reference to FIG. 2. Application 102 may be configured to provide a user interface for the user when using client device 101. Application 102 may be configured to communicate, via client device 101, with other client devices, with short-range transceiver 105, and with server 110. Application 102 may be configured to receive requests and send messages as described herein with reference to client device 101. Application 102 may comprise a standard messaging application for a client device. Application 102 may comprise a standard text messaging application for a mobile device, such as, e.g., a short message service (SMS) messaging application. User information, including identifiers and/or keys, may be stored in database 130.

Short-range transceiver 105 may be associated with a user, and may be unique to the user and/or to a specific user account. Short-range transceiver 105 may include, for example, a contactless card, and may include features further described below with reference to FIG. 3. Short-range transceiver 105 may have memory storing an applet 106 and/or a token 107. Token 107 may be associated with the user. Token 107 may include a user key, or may be generated based on a key (associated with the user) stored on short-range transceiver 105.

A token may be used to increase security through token authorization. Server 110 may send a validation request to a client device, such as client device 101, receive responsive information from the client device, and if validated, send a validation token back to the client device. The validation token may be based on a pre-determined token, or may be a dynamic token based on an algorithm that can be secret and known only to server 110 and the client device; the algorithm may include live parameters independently verifiable by the participants, such as the temperature at a particular location or the time. The token may be used to verify the identity of the user. The validation request and/or validation token may be based on token 107.

At label 150, the user may launch application 102 running on client device 101. In some embodiments, application 102 may be launched after entry of short-range transceiver 105 into a short-range communication field of client device 101, such as, e.g., in response to a tap action between short-range transceiver 105 and client device 101. For example, if short-range transceiver 105 is a contactless card and client device 101 is a mobile device, the tap action may include tapping the contactless card on a screen or other portion of client device 101. However, a tap action is not limited to a physical tap by short-range transceiver 105 against client device 101, and may include other gestures, such as, e.g., a wave or other movement of short-range transceiver 105 in the vicinity of client device 101 (or vice-versa) such that short-range transceiver 105 enters a short-range communication field of client device 101. In some embodiments, application 102 may be launched at a later time (see label 156 below). In some embodiments, application 102 may require a sign-in or login process, which may be accomplished via, e.g., entering a username and password, or scanning a biometric image such as a fingerprint scan, retina scan, facial scan, etc.

In some example embodiments, application 102 may display an instruction on client device 101 prompting the user to initiate a tap action between short-range transceiver 105 and client device 101. As used herein, a tap action may include tapping short-range transceiver 105 against client device 101 (or vice-versa). For example, if short-range transceiver 105 is a contactless card and client device 101 is a mobile device, the tap action may include tapping the contactless card on a screen or other portion of client device 101. However, a tap action is not limited to a physical tap by short-range transceiver 105 against client device 101, and may include other gestures, such as, e.g., a wave or other movement of short-range transceiver 105 in the vicinity of client device 101 (or vice-versa) such that short-range transceiver 105 enters a short-range communication field of client device 101. An action taken in response to a tap action between short-range transceiver 105 and client device 101 may include any responsive action that is initiated upon or after entry of short-range transceiver 105 into the short-range communication field of client device 101.

At label 152, there may be a first tap action between short-range transceiver 105 and client device 101. The first tap action may be in response to a prompt displayed on client device 101. The first tap action may indicate the user's desire to engage in a message session with server 110.

At label 154, client device 101 may communicate with short-range transceiver 105 (e.g., after short-range transceiver 105 is brought near client device 101). Communication between client device 101 and short-range transceiver 105 may involve short-range transceiver 105 (such as, e.g., a contactless card) being sufficiently close to a card reader (not shown) of the client device 101 to enable NFC data transfer between client device 101 and short-range transceiver 105, and may occur in response to a tap action between short-range transceiver 105 and client device 101 (such as, e.g., the tap action at label 152). The communication may include exchange of data or commands to establish a communication session between application 102 and short-range transceiver 105. The exchange of data may include transfer or exchange of one or more keys or tokens, which may be preexisting keys or generated as session keys, and/or may include token 107. In some example embodiments, the communication may occur upon entry of short-range transceiver 105 into a short-range communication field of client device 101 prior to a tap action between short-range transceiver 105 and client device 101.

At label 156, short-range transceiver 105 may transmit to client device 101 a Uniform Resource Identifier (URI) that includes a message destination and a message payload. The URI with message destination and message payload may be formatted according to the NFC Data Exchange Format (NDEF). The message destination may be a destination address for server 110, and may be stored in memory (not shown) of short-range transceiver 105. The message payload may include a user identifier. In some embodiments, the message payload may also include a request to engage in a verified message session with the server. In some embodiments, a message sent to the server at the destination address may be handled by the server as a request to engage in a verified message session with the server. In some embodiments, transmitting the URI by short-range transceiver 105 may occur in response to a tap action between short-range transceiver 105 and client device 101 (such as, e.g., the tap action at label 152). The URI may be configured for the SMS scheme, and may be of the form sms:+<address>?body=<payload>. The portion denoted <address> may be a destination number for the server to receive SMS messages, and the portion denoted <payload> may be the message payload which may include a user identifier. The <payload> portion may also include a request to engage in a verified message session with the server. Applet 106 of short-range transceiver 105 may read data from short-range transceiver 105, construct the URI and send the URI to client device 101. In some embodiments, the message payload may include token 107, which may include a user key. In some embodiments, token 107 in the message payload may include a data item, such as a counter, stored on the card, and/or a cryptogram generated by applet 106 using the card number, a key on the card and/or the data item (e.g., counter) stored on the card.

Continuing with label 156, upon receiving the URI from short-range transceiver 105, client device 101 may launch, or make active, application 102, which may be a standard messaging application such as, e.g., a standard SMS messaging application. Client device 101 may use the destination address in the URI to address the message via the messaging application, and may use the message payload to pass a user identifier via the messaging application to the destination. In the example of an SMS-styled URI, client device 101 may use the destination address (<address> portion in the preceding example) to address an SMS-compatible message, using the SMS messaging application, to a telephone number corresponding to a destination server, such as server 110; client device 101 may use the message payload (<payload> portion in the preceding example) to pre-populate the SMS-compatible message with the contents of the payload, such as the user identifier and any additional characters or code to serve as a message session request.

At label 158, client device 101 may transmit a message session request to server 110, addressed to the destination address via application 102. In some embodiments, the message session request may be transmitted to server 110 automatically; in some embodiments, the message session request may be transmitted to server 110 after further user interaction, such as, e.g., pressing or selecting a "send" button or icon. The message session request may include (or otherwise be accompanied by) the message payload received from short-range transceiver 105 (label 156). In the example of an SMS-styled URI, client device 101 may send an SMS-compatible message with message payload (described above with reference to label 156), via application 102, to a telephone number corresponding to server 110. In some embodiments, the message payload may include a request to engage in a verified message session; in some embodiments, the transmission of the message to server 110 is itself the message session request, and is treated as such by the receiving server 110. In some embodiments, the message payload may include a cryptogram generated by applet 106 using the card number, a key on the card and/or a counter stored on the card.

In some embodiments, the message session request may include the URI in addition to the message payload. The inclusion of the URI along with the message payload may facilitate verification of the user by the server 110. The user can be verified and a telephone number associated with the user can be looked up and confirmed by the server 110 using one or more accessible databases, and the SMS message may be initiated using the confirmed phone number. The verification and use of a confirmed phone number may provide increased security.

At label 160, processor 120 may obtain a user identifier from the message session request received by server 110 from client device 101. The user identifier may be obtained from the message payload contained in or otherwise accompanying the message session request. In some embodiments, the message session request may be for an SMS message session, and the user identifier may be obtained from the body of the SMS message from client device 101.

At label 162, processor 120 may obtain a client device address corresponding to the user as identified by the user identifier. The client device address may be obtained from data stored in database 130, and may be obtained based on a database lookup using the user identifier. As discussed above, the client device address may comprise a mobile phone number, an IP address or any other unique address corresponding to client device 101.

At label 164, processor 120 may obtain a source address representing the address of the client device 101 that sent the message session request. The source address may be obtained from data, such as metadata, included in or otherwise accompanying the message session request. For example, in the case of an SMS message session request where the request as received may be in the form of an SMS message sent by a mobile phone, the source address may be obtained from caller ID data accompanying the SMS message session request, and may be in the form of a mobile phone number for the sending device.

At label 166, processor 120 may compare the source address with the client device address (label 162) to determine if they correspond to the same client device 101. If the source address and the client device address correspond to the same client device 101, the client device 101 may be deemed verified. In some embodiments, in the case of an SMS message session request where the request as received may be in the form of an SMS message sent by a mobile phone, processor 120 may compare the mobile phone number from the caller ID (label 164) with the mobile phone number obtained from the database lookup based on the user identifier (label 162), and the client device may be verified if these mobile phone numbers match.

In some embodiments, at label 168, if the message payload includes a user key associated with the user (as described above), processor 120 may use the user key to authenticate the user as the user associated with client device 101 and/or short-range transceiver 105. Database 130 may store a copy of the user key, or a key associated with the user that may be used to generate a copy of the user key. Generating a copy of the user key based on the key associated with the user may include using a counter or other data derived or otherwise maintained in synchronization between processor 120, client device 101 and/or short-range transceiver 105.

At label 170, based on the results of the device verification (label 166) and any authentication process (label 168), processor 120 may send a response message to application 102 (via client device 101) confirming that the user's request is accepted and initiating the message session with the user. The response message may be in a form compatible with application 102. In some embodiments, the response message may be routed by the server to a messaging gateway, which may be a standard messaging gateway such as a short message service (SMS) gateway, for delivery to client device 101.

In some embodiments, processor 120 may instead send a denial notification (not shown) to application 102 (via client device 101), indicating that the user's request to engage in a message session with the server has been denied. A denial notification may include, or be accompanied by, additional data that may indicate a reason for the denial (such as, e.g., a failure to verify the client device or failure to authenticate the user). In some embodiments, in case of a denial, a first denial notification may be sent to the client device address (label 162) and a second denial notification may be sent to the source address (label 164).

At label 172, the user may use application 102 (via client device 101) to engage in a message session with server 110 via an application executing on the server, which may include, e.g., a messaging or chat application, a messaging or chat bot, AI (artificial intelligence) bot, etc. During the message session, the user, using application 102, and the server may exchange text or data, such as, e.g., providing questions and answers. The message session may involve the exchange of data or information in any form compatible with application 102 (including, for example multimedia data if application 102 supports exchange of multimedia data, such as via MMS messaging). In some embodiments, as part of the message session the server may provide menu options for the user to select.

In some embodiments, the message session may be of a limited duration. The server may establish that the message session is limited to a predetermined period of time (such as, e.g., 5 minutes, 10 minutes, 30 minutes, etc.). In some embodiments, the server may label the message session as a secure message session. In some embodiments, the server may encrypt/decrypt data or information as part of the message session, and may transmit encrypted information to application 102 so long as application 102 supports encryption/decryption.

At label 174, there may be a second tap action between short-range transceiver 105 and client device 101. The second tap action may be in response to a prompt displayed on client device 101. The second tap action may indicate the user's desire to terminate the message session with server 110. In some embodiments, the second tap action may indicate the user's desire to maintain the message session with server 110.

At label 176, client device 101 may transmit a message session end request to server 110. Transmission of the message session end request may occur in response to a tap action between short-range transceiver 105 and client device 101 (such as, e.g., the second tap action at label 174). In some embodiments, transmission of the message session end request may occur as the result of a user entry (such as, e.g., entering the text "GOODBYE," "END" or the like in application 102 and pressing send).

At label 178, processor 120 may terminate the message session and may transmit a session end (termination) message to client device 101. Termination of the message session may occur in response to a session end (termination) request received from client device 101. In some embodiments, termination of the message session may occur after a period of time has passed without any messages or other input received from client device 101. In some embodiments, the period of time may be a first predetermined period of time (such as, e.g., 2 minutes, 5 minutes, or 15 minutes).

In some embodiments, processor 120 may send a warning message (not shown) to client device 101 alerting the user that the message session may be terminated unless a response is received from client device 101 within a period of time, which may be a second predetermined period of time (such as, e.g., 15 seconds, 30 second, 60 seconds, 90 seconds) In some embodiments, the user may respond by tapping short-range transceiver 105 together with client device 101 to indicate a desire to maintain the message session. In some embodiments, a tap action between client device 101 and short-range transceiver 105 may re-initiate the verification and authentication processes described above.

Figure 2:
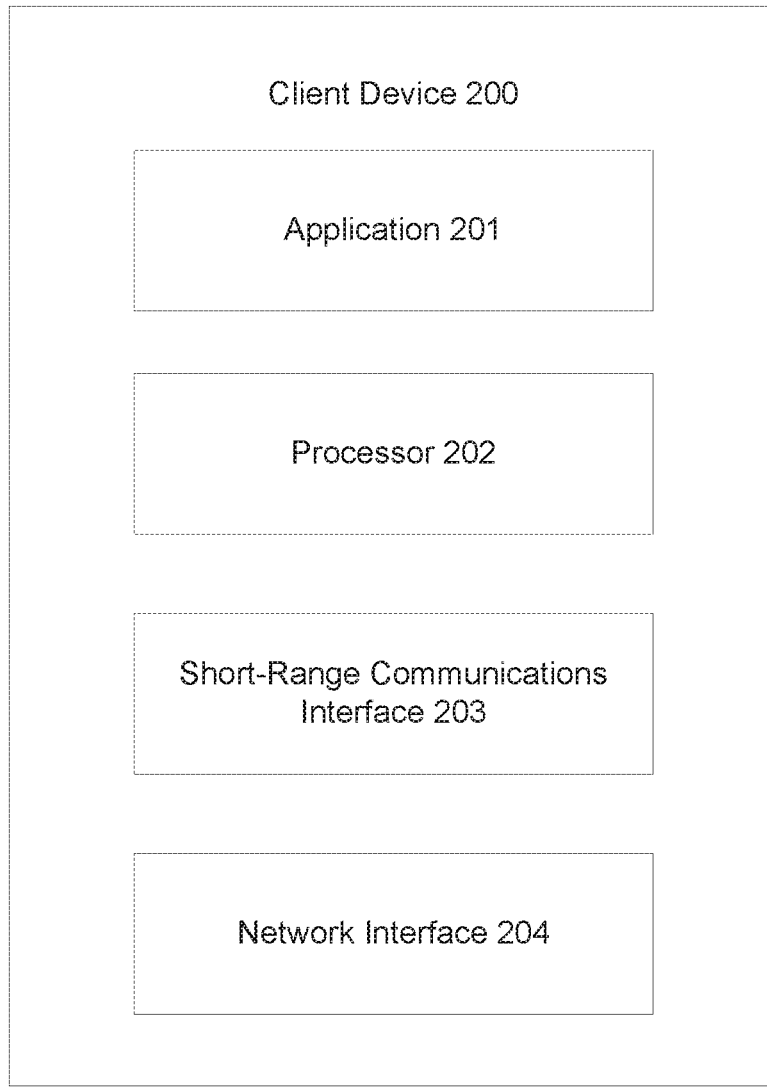
FIG. 2 illustrates components of a client device used in a verified messaging system according to one or more example embodiments.

FIG. 2 illustrates components of a client device 200 used in a verified messaging system according to one or more example embodiments. Client device 200 may be one or more of client devices 101, described above with reference to FIGS. 1A-1B. Client device 200 may include one or more applications 201, one or more processors 202, a short-range communications interface 203, a network interface 204, and memory (not shown). Application 201 may include one or more software applications or executable program code to be executed on processor 202 and configured to carry out features described herein for any client devices, such as client device 101, and/or any of the features described herein with reference to application 102. Application 201 may include a standard messaging application. Application 201 may be configured, for example, to transmit and/or receive data with other devices via client device 101, such as, e.g., via short-range communications interface 203 and/or network interface 204. For example, application 201 may be configured to initiate one or more requests, such as near field data exchange requests to a short-range transceiver (such as a contactless card). Application 201 may also be configured to provide a user interface via a display (not shown) for a user of the client device. Application 201 may be stored in memory in client device 200; the memory may include a read-only memory, write-once read-multiple memory and/or read/write memory, e.g., RAM, ROM, and/or EEPROM.

Processor 202 may include one or more processing devices such as a microprocessor, RISC processor, ASIC, etc., and may include associated processing circuitry. Processor 202 may include, or be connected to, memory storing executable instructions and/or data, as may be necessary or appropriate to control, operate or interface with the other features of client device 200, including application 201. Processor 202 (including any associated processing circuitry) may contain additional components including processors, memories, error and parity/CRC checkers, data encoders, anticollision algorithms, controllers, command decoders, security primitives and tamperproofing hardware, as necessary to perform the functions described herein.

Short-range communications interface 203 may support communication via a short-range wireless communication field, such as NFC, RFID, or Bluetooth. Short-range communications interface 203 may include a reader, such as a mobile device NFC reader. Short-range communications interface 203 may be incorporated into network interface 204, or may be provided as a separate interface.

Network interface 204 may include wired or wireless data communication capability. These capabilities may support data communication with a wired or wireless communication network, including the Internet, a cellular network, a wide area network, a local area network, a wireless personal area network, a wide body area network, a WiFi network, any other wired or wireless network for transmitting and receiving a data signal, or any combination thereof. Such network may include, without limitation, telephone lines, fiber optics, IEEE Ethernet 902.3, a wide area network, a local area network, a wireless personal area network, a wide body area network or a global network such as the Internet.

Client device 200 may also include a display (not shown). Such display may be any type of device for presenting visual information such as a computer monitor, a flat panel display, or a mobile device screen, including liquid crystal displays, light-emitting diode displays, plasma panels, and cathode ray tube displays.

Client device 200 may also include one or more device inputs (not shown). Such inputs may include any device for entering information into the client device that is available and supported by the client device 200, such as a touchscreen, keyboard, mouse, cursor-control device, touchscreen, microphone, digital camera, video recorder, or camcorder. The device inputs may be used to enter information and interact with the client device 200 and, by extension, with the systems described herein.

Figure 3:
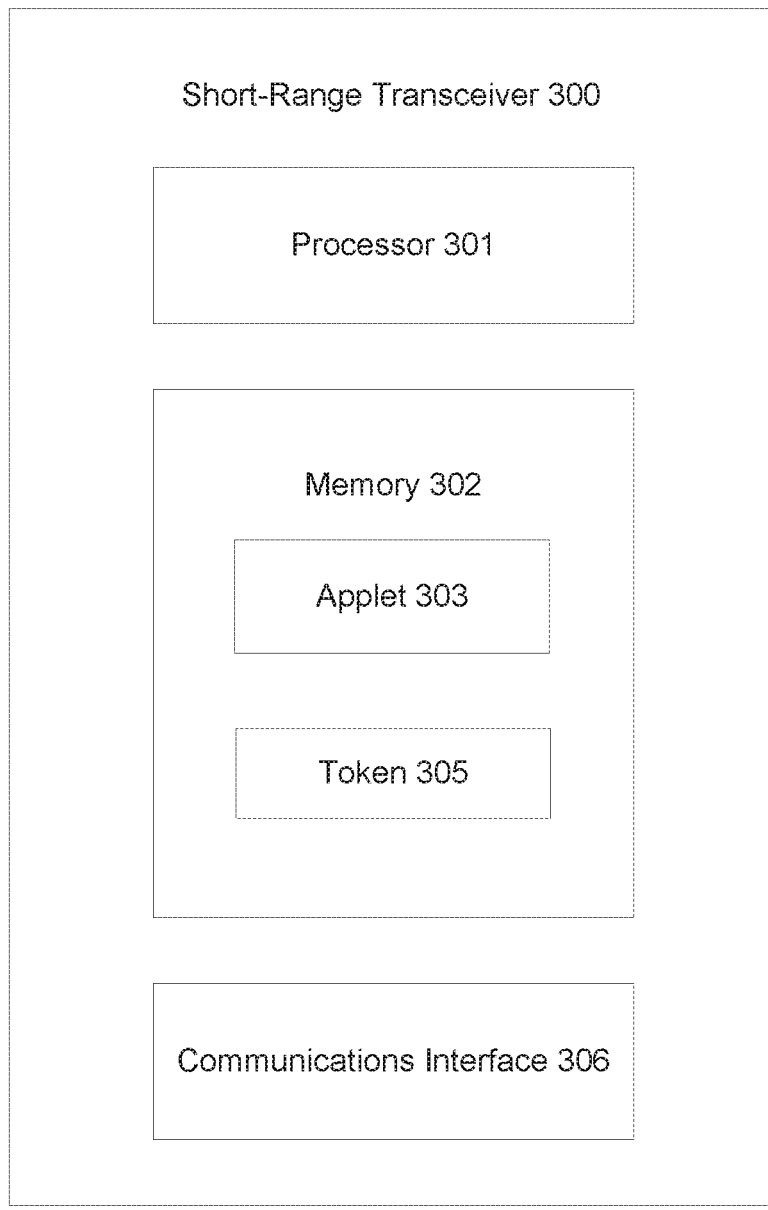
FIG. 3 illustrates components of a short-range transceiver used in a verified messaging system according to one or more example embodiments.

FIG. 3 illustrates components of a short-range transceiver 300 used in a verified messaging system according to one or more example embodiments. In one or more example embodiments, short-range transceiver 300 may be one or more of short-range transceiver 105, described above with reference to FIGS. 1A-1B. Short-range transceiver 300 may include, for example, a contactless card, a smart card, or may include a device with a varying form factor such as a fob, pendant or other device configured to communicate within a short-range communications field. Short-range transceiver 300 may include a processor 301, memory 302, applet 303, token 305 and short-range communications interface 306.

Processor 301 may include one or more processing devices such as a microprocessor, RISC processor, ASIC, etc., and may include associated processing circuitry. Processor 301 may include, or be connected to, memory storing executable instructions (such as, e.g., applet 303) and/or data, as may be necessary or appropriate to control, operate or interface with the other features of short-range transceiver 300. Processor 301 (including any associated processing circuitry) may contain additional components including processors, memories, error and parity/CRC checkers, data encoders, anticollision algorithms, controllers, command decoders, security primitives and tamperproofing hardware, as necessary to perform the functions described herein.

Memory 302 may be a read-only memory, write-once read-multiple memory and/or read/write memory, e.g., RAM, ROM, and EEPROM. Memory 302 may be configured to store applets 303 and one or more tokens 305. Applet 303 may comprise one or more software applications configured to execute on processor 301, such as a Java Card applet that may be executable on a contactless card. However, it is understood that applet 303 is not limited to a Java Card applet, and instead may be any software application operable on contactless cards or other devices having limited memory. Applet 303 may be configured to respond to one or more requests (such as near field data exchange requests) from a client device, including requests from a device having a reader such as a mobile device NFC reader. Applet 303 may be configured to read (or write) data, including token 305, from (or to) memory 302 and provide such data in response to a request. Applet 303 may be configured to respond to NDEF read commands and provide data according to the NDEF format.

Token 305 may include a unique alphanumeric identifier assigned to a user of the short-range transceiver 300, and the identifier may distinguish the user of the short-range transceiver 300 from other users of other short-range transceivers (such as other contactless card users). In some example embodiments, token 305 may identify both a user and an account assigned to that user and may further identify the short-range transceiver (such as a contactless card) associated with the user's account. In some example embodiments, token 305 may include, or be generated from, a key unique to the user with which the short-range transceiver is associated.

Short-range communications interface 306 may support communication via a short-range wireless communication field, such as NFC, RFID, or Bluetooth. Short-range transceiver 300 may also include one or more antennas (not shown) connected to short-range communications interface 306 to provide connectivity with a short-range wireless communications field.

Figure 4:
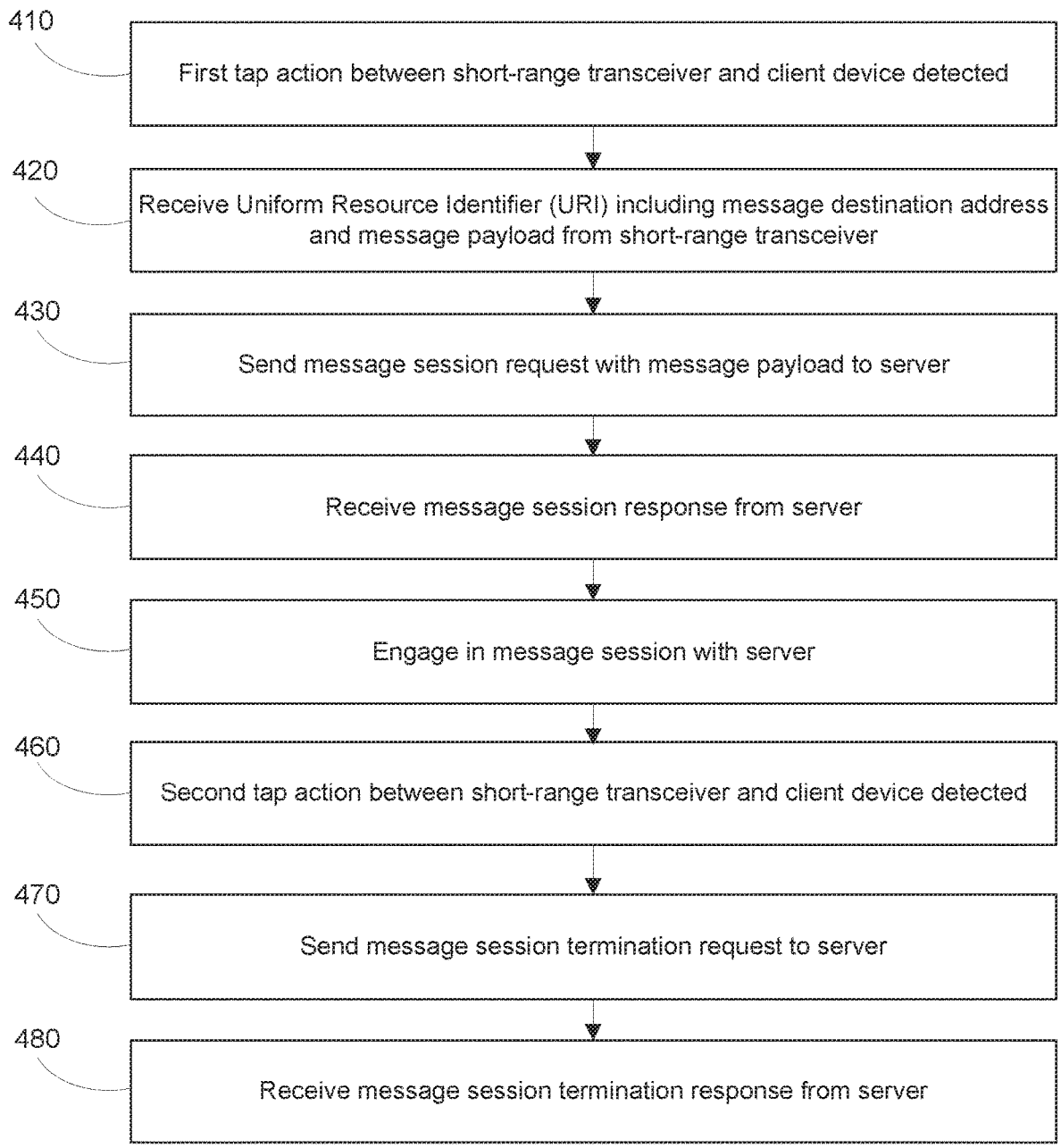
FIG. 4 provides a flowchart illustrating one or more methods of verified messaging according to one or more example embodiments.

FIG. 4 is a flowchart illustrating a method of verified messaging 400 according to one or more example embodiments, with reference to components and features described above, including but not limited to the figures and associated description. Verified messaging method 400 may be carried out by application 102 executing on client device 101 associated with the user. Short-range transceiver 105 is associated with the user.

At block 410, a first tap action may be detected between short-range transceiver 105 and client device 101. The tap action may be in response to a prompt displayed on client device 101. The first tap action may indicate the user's desire to engage in a message session with server 110. As described above, short-range transceiver 105 may be a contactless card.

At block 420, a Uniform Resource Identifier (URI) including a message destination and a message payload, as described above with reference to FIG. 1B, may be received from short-range transceiver 105. The message destination may be a destination address for server 110. The message payload may include a user identifier. In some embodiments, the message payload may also include a request to engage in a verified message session with the server. In some embodiments, the message payload may include token 107, which may include a user key. In some embodiments, token 107 in the message payload may include a cryptogram generated by short-range transceiver 105. In some embodiments, the transmission of the URI by short-range transceiver 105 may occur in response to the first tap action (block 410).

At block 430, application 102 of client device 101 may send to server 110 a message session request, as described above with reference to FIG. 1B, requesting a verified message session with the server. The message session request may be addressed to the destination address provided with the URI. The message session request may include (or otherwise be accompanied by) the message payload, which may include a user identifier. In the example of an SMS-styled URI, application 102 of client device 101 may use the destination address to address an SMS-compatible message, using the SMS messaging application, to a telephone number corresponding to server 110; client device 101 may use the message payload to pre-populate the SMS-compatible message with the contents of the payload, which may include the user identifier, additional characters or code to serve as a message session request, a user token (e.g., token 107) and/or cryptogram. In some embodiments, a message sent to the server at the destination address may be handled by the server as a request to engage in a verified message session with the server. In some embodiments, the message session request may include the URI to facilitate verification of the user by the server 110. The user can be verified and a telephone number associated with the user can be looked up and confirmed by the server 110 using one or more accessible databases, and the SMS message may be initiated using the confirmed phone number.

At block 440, application 102 may receive a message session response from server 110, as described above with reference to FIG. 1B, confirming that the user's request is accepted and initiating the message session with the user. The message session response may be in a form compatible with application 102. In an embodiment, application 102 may instead receive a denial notification from server 110 as described above with reference to FIG. 1B, indicating that the user's request to engage in a message session with the server has been denied. A denial notification may include, or be accompanied by, additional data that may indicate a reason for the denial.

At block 450, the user may, via application 102, engage in a message session with server 110 via an application executing on the server, which may include, e.g., a messaging or chat application, a messaging or chat bot, AI bot, etc., as described above with reference to FIG. 1B.

At block 460, a second tap action may be detected between short-range transceiver 105 and client device 101. The tap action may be in response to a prompt displayed on client device 101. The second tap action may indicate the user's desire to terminate the message session with server 110.

At block 470, application 102 of client device 101 may send to server 110 a message session termination request, as described above with reference to FIG. 1B. In some embodiments, sending of the message session termination request may occur in response to the second tap action (block 460).

At block 480, a message session termination response may be received from server 110, as described above with reference to FIG. 1B, indicating that the message session has been terminated. The message session termination response may occur in response to the session termination request (block 470). In some embodiments, termination of the message session may occur after a period of time has passed without any messages or other input from client device 101. In some embodiments, the period of time may be a first predetermined period of time. In some embodiments, a warning message may be received alerting the user that the message session may be terminated unless a response is received from client device 101 within a period of time, which may be a second predetermined period of time.

Figure 5A:
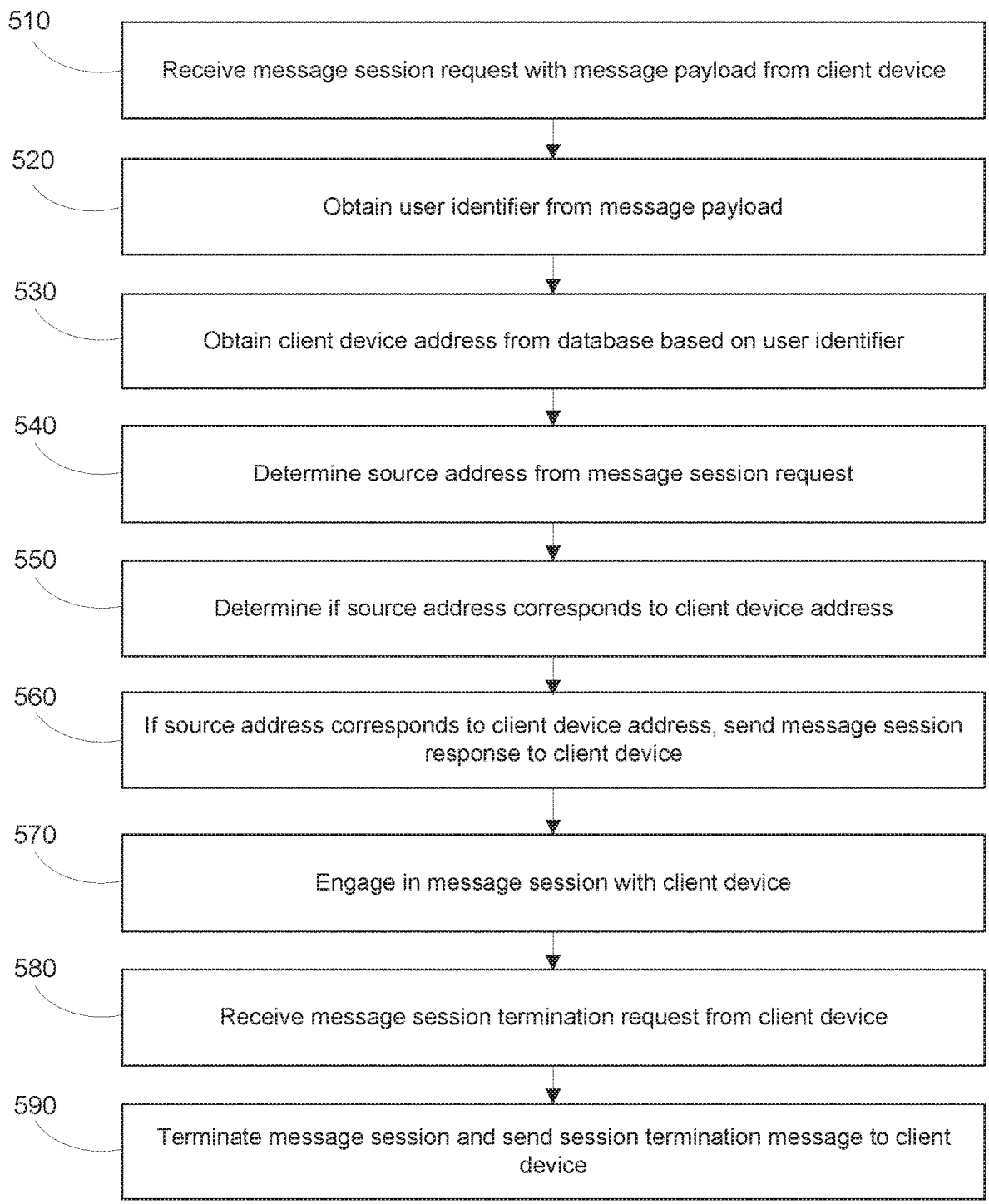
FIG. 5A provides a flowchart illustrating one or more methods of verified messaging according to one or more example embodiments.

FIG. 5A is a flowchart illustrating a method of verified messaging 500 according to one or more example embodiments, with reference to components and features described above, including but not limited to the figures and associated description. Verified messaging method 500 may be carried out by processor 120 in communication with, via server 110, client device 101.

At block 510, a message session request may be received from the user's client device 101, as described above with reference to FIG. 1B, requesting a verified message session with the server. The message session request may include (or otherwise be accompanied by) the message payload, which may include a user identifier, additional characters or code to serve as a message session request, a user token (e.g., token 107) and/or cryptogram. The message session request may comprise a message (e.g., an SMS message) from a standard messaging application (such as, e.g., a standard SMS messaging application). In some embodiments, a message received by the server at a destination address (such as, e.g., a telephone number corresponding to the server) may be handled by the server as a request to engage in a verified message session.

At block 520, a user identifier may be obtained from the received message session request. The user identifier may be obtained from the message payload contained in or otherwise accompanying the message session request. In some embodiments, the message session request may be for an SMS message session, and the user identifier may be obtained from the body of the received SMS message.

At block 530 a client device address corresponding to the user as identified by the user identifier may be obtained. The client device address may be obtained from data stored in database 130, and may be obtained based on a database lookup using the user identifier. As discussed above, the client device address may comprise a mobile phone number, an IP address or any other unique address corresponding to client device 101.

At block 540, a source address representing the address of the client device 101 that sent the message session request may be obtained, as described above with reference FIG. 1B, from data, such as metadata, included in or otherwise accompanying the message session request. For example, in the case of an SMS message session request where the request as received may be in the form of an SMS message sent by a mobile phone, the source address may be obtained from caller ID data accompanying the SMS message session request, and may be in the form of a mobile phone number for the sending device.

At block 550, a verification process may be carried out, as described above with reference to FIG. 1B (in particular labels 162-166), to compare the source address (block 540) with the client device address (block 530) to determine if they correspond to the same client device 101. If the source address and the client device address correspond to the same client device 101, the client device 101 may be deemed verified. In some embodiments, in the case of an SMS message session request where the request as received may be in the form of an SMS message sent by a mobile phone, the mobile phone number from the caller ID (block 540) may be compared with the mobile phone number obtained from the database lookup based on the user identifier (block 530), and the client device may be verified if these mobile phone numbers match.

At block 560, based on positive results of the verification process (block 550), a message session response may be sent to client device 101, as described above with reference to FIG. 1B, confirming that the user's request is accepted and initiating the message session with the user. The message session response may be in a form compatible with application 102 of client device 101. In an embodiment, a denial notification may be sent instead to client device 101, as described above with reference to FIG. 1B, indicating that the user's request to engage in a message session with the server has been denied. A denial notification may include, or be accompanied by, additional data that may indicate a reason for the denial.

At block 570, server 110 may, via an application executing on the server (which may include, e.g., a messaging or chat application, a messaging or chat bot, AI bot, etc.), engage in a message session with the user via application 102 executing on client device 101, as described above with reference to FIG. 1B. The message session may include sending a first message to application 102 (via client device 101). The message session may include receiving a second message from application 102 (via client device 101). The second message may be responsive to the first message. The message session may include sending a third message to application 102 (via client device 101). The third message may be responsive to the second message.

At block 580, a message session termination request may be received from client device 101, as described above with reference to FIG. 1B.

At block 590, the message session with the user may be terminated, as described above with reference to FIG. 1B. A session termination message may be sent to the user's client device 101. The message session with the user may be terminated, and any termination message sent, in response to the message session termination request (block 580). In some embodiments, termination of the message session may occur after a period of time has passed without any messages or other input from client device 101. In some embodiments, the period of time may be a first predetermined period of time. In some embodiments, a warning message may be sent to client device 101 alerting the user that the message session may be terminated unless a response is received from the user's client device within a period of time, which may be a second predetermined period of time. The required response to avoid session termination may be a message from client device 101, which may be generated in response to a tap action between client device 101 and short-range transceiver 105. The first predetermined period of time may be reset upon each message received from client device 101.

Figure 5B:
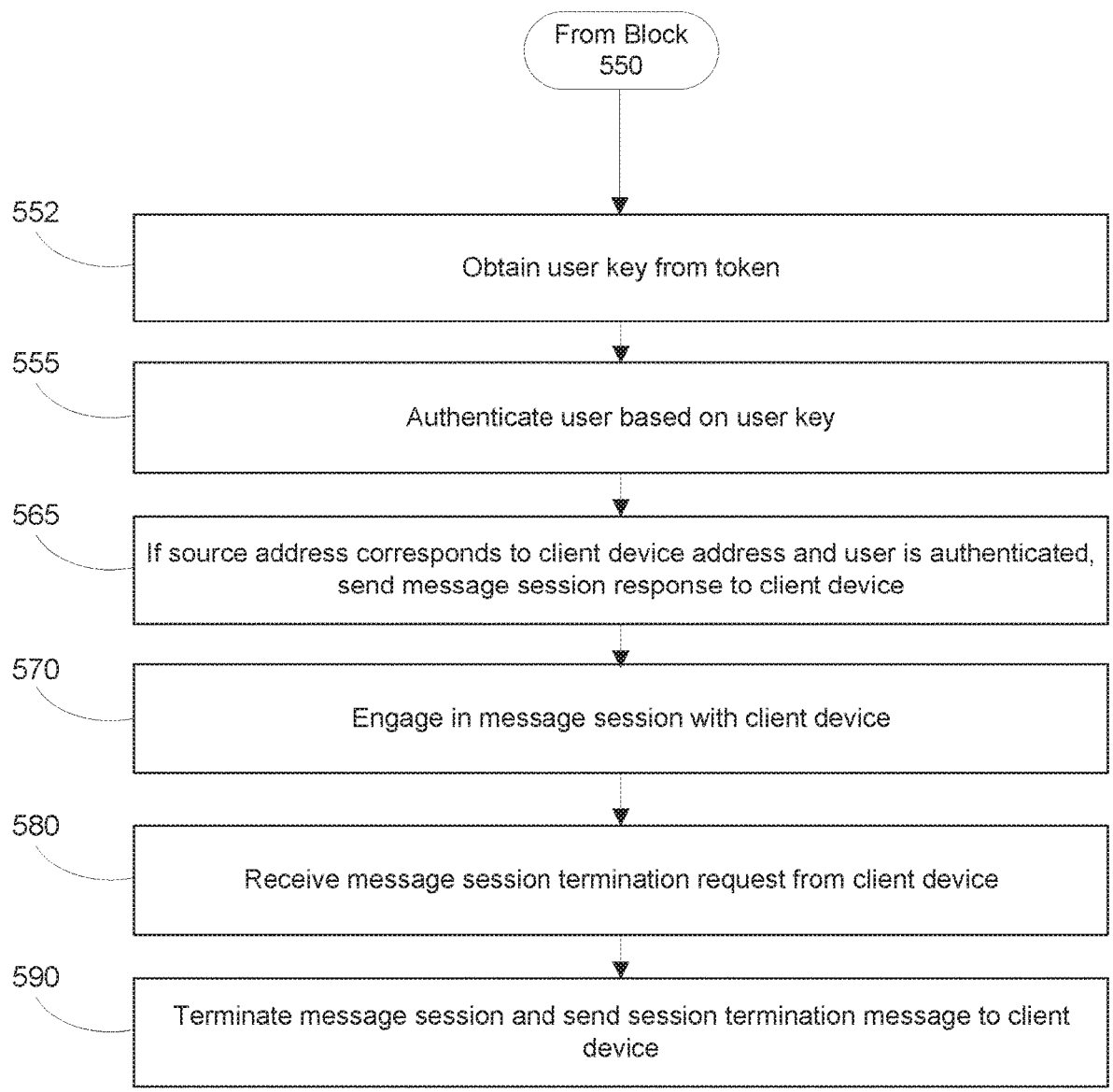
FIG. 5B provides a flowchart illustrating one or more methods of verified messaging according to one or more example embodiments.

FIG. 5B is a flowchart illustrating a method of verified messaging 501 according to one or more example embodiments, with reference to components and features described above, including but not limited to the figures and associated description. Verified messaging method 501 may be carried out by processor 120 in communication with, via server 110, client device 101 associated with a user. Blocks 510 through 550 of method 501 include the same activity described above with reference to method 500 of FIG. 5A; method 501 then proceeds to block 552.

At block 552, it may be determined that a user token is present in the message payload received from client device 101; the user token may be based on a user key.

At block 555, the user may be authenticated based on a user key obtained from the user token. As described above with reference to label 168 (FIG. 1B), database 130 may store a copy of the user key, or a key associated with the user that may be used to generate a copy of the user key. Generating a copy of the user key based on the key associated with the user may include using a counter or other data derived or otherwise maintained in synchronization between processor 120, client device 101 and/or short-range transceiver 105. The user may be authenticated, for example, if the user key received from client device 101 is matched to the user key obtained from, or generated from the key associated with the user and stored in, database 130. In some embodiments, the user may be authenticated, based on the user key received from client device 101, via other techniques.

At block 565, based on positive results of the verification process (block 550) and positive results of the authentication process (block 555), a message session response may be sent to client device 101, as described above with reference to FIG. 1B, confirming that the user's request is accepted and initiating the message session with the user. The message session response may be in a form compatible with application 102 of client device 101. In an embodiment, a denial notification may be sent instead to client device 101, as described above with reference to FIG. 1B, indicating that the user's request to engage in a message session with the server has been denied. A denial notification may include, or be accompanied by, additional data that may indicate a reason for the denial.

Method 501 then proceeds to the activities of blocks 570-590 as described above with reference to FIG. 1A.

The description of embodiments in this disclosure provides non-limiting representative examples referencing figures and numerals to particularly describe features and teachings of different aspects of the disclosure. The embodiments described should be recognized as capable of implementation separately, or in combination, with other embodiments from the description of the embodiments. A person of ordinary skill in the art reviewing the description of embodiments should be able to learn and understand the different described aspects of the disclosure. The description of embodiments should facilitate understanding of the disclosure to such an extent that other implementations, not specifically covered but within the knowledge of a person of skill in the art having read the description of embodiments, would be understood to be consistent with an application of the disclosure Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for verified messaging, comprising:
a database storing user information for a plurality of users, the user information including, for each of the plurality of users, a user identifier and a client device address;
a server configured to communicate over a network with a client device, the client device belonging to a user;
a contactless card for the user, the contactless card configured for data communication via a short-range communication field of the client device, the contactless card comprising at least one card processor and at least one card memory, the at least one card memory storing data and a card applet, wherein the card applet is configured to provide a uniform resource identifier (URI) after entry by the contactless card into the short-range communication field of the client device, and wherein the URI comprises a message destination address of the server and a message payload; and
at least one processor in data communication with the server and the database, wherein the at least one processor:
receives a message session request from the client device, the message session request including the message payload,
determines, based on the message payload, the user identifier corresponding to the user,
identifies a client device address for the user,
determines whether the client device address for the user corresponds to a source address accompanying the message session request, and
sends a response message to the client device, the response message addressed to the client device address.

2. The system of claim 1, wherein the URI is configured for a short message service (SMS) message and the message destination address comprises a short message service (SMS) address.

3. The system of claim 2, wherein the request comprises a short message service (SMS) message.

4. The system of claim 3, wherein the client device address comprises a mobile telephone number assigned to the client device.

5. The system of claim 4, wherein the source address accompanying the request is obtained from caller identification data.

6. The system of claim 5, wherein the response message is a short message service (SMS) message.

7. The system of claim 6, wherein the server is configured for data communication with a short message service (SMS) gateway, and the response message is routed by the server to the SMS gateway.

8. The system of claim 1, wherein the message payload includes a token associated with the user.

9. The system of claim 8, wherein the at least one processor authenticates the user based on a user key obtained from the token.

10. The system of claim 1, wherein the short-range communication field comprises near field communication (NFC) and the contactless card is configured to communicate the URI according to the NFC Data Exchange Format (NDEF).

11. A method for verified messaging, comprising:
providing, by a card applet of a contactless card for a user after entry of the contactless card into a communication field of a client device belonging to a user, the contactless card comprising at least one card processor and a card memory storing data and the card applet, a uniform resource identifier (URI) into the short-range communication field of the client device, wherein the URI comprises a message destination address of a server and a message payload;
receiving, by the server, a message session request from the client device, the message session request including the message payload;
determining, by the server based on the message payload, a user identifier corresponding to the user, wherein the server is in data communication with a database storing user information for a plurality of users, the user information including, for each of the plurality of users, a user identifier and a client device address;
identifying, by the server, a client device address for the user;
determining, by the server, whether the client device address for the user corresponds to a source address accompanying the message session request; and
sending, by the server, a response message to the client device, the response message addressed to the client device address.

12. The method of claim 11, wherein the message payload further includes a request to engage in a verified message session.

13. The method of claim 11, wherein the message session request comprises a short message service (SMS) message.

14. The method of claim 11, wherein:
the message payload further includes a token, and
the token includes a user key.

15. The method of claim 11, wherein the message payload further includes a data item from a contactless card.

16. The method of claim 15, wherein the data item includes at least one selected from the group of a counter and a cryptogram generated using the counter.

17. A method for verified messaging, comprising:
providing, by an applet of a contactless card for a user after entry of the contactless card into a communication field of a client device belonging to a user, the contactless card comprising at least one card processor and a card memory storing data and the card applet, a uniform resource identifier (URI) into the short-range communication field of the client device, wherein:
the URI comprises a message destination address of a server and a message payload, and
the message payload includes a user key and a cryptogram;
receiving, by the server, a message session request from the client device, the message session request including the message payload;
determining, by the server based on the message payload, a user identifier corresponding to the user;
identifying, by the server, a client device address for the user;
determining, by the server, whether the client device address for the user corresponds to a source address accompanying the message session request; and sending, by the server, a response message to the client device, the response message addressed to the client device address.

18. The method for verified messaging of claim 17, wherein:
the card memory further includes a card number and a counter, and
the cryptogram is generated using the user key, the card number, and the counter.

19. The method for verified messaging of claim 17, wherein:
the server is in data communication with a database storing user information for a plurality of users, and
the user information includes, for each of the plurality of users, a user identifier and a client device address.

20. The method for verified messaging of claim 17, wherein the client device address comprises a mobile phone number.

* * * * *